United States Patent [19]

Sol et al.

[11] Patent Number: 5,136,513
[45] Date of Patent: Aug. 4, 1992

[54] VEHICLE INERTIA AND CENTER OF GRAVITY ESTIMATOR

[75] Inventors: David Sol, Dearborn; Shunso F. Watanabe, Livonia, both of Mich.

[73] Assignee: Ford Motor Company, Dearborn, Mich.

[21] Appl. No.: 536,389

[22] Filed: Jun. 11, 1990

[51] Int. Cl.[5] ............................................. G01M 1/30
[52] U.S. Cl. ................................. 364/463; 364/424.05
[58] Field of Search ............... 364/463, 424.05, 567; 73/1 B; 177/25.13

[56] References Cited

U.S. PATENT DOCUMENTS

| | | | |
|---|---|---|---|
| 4,110,605 | 8/1978 | Miller | 364/463 |
| 4,445,725 | 5/1984 | Sivulka | 303/6 C |
| 4,545,019 | 10/1985 | Glover | 364/463 |
| 4,603,921 | 8/1986 | Liggett | 180/273 |
| 4,627,011 | 12/1986 | Spencer et al. | 364/566 |
| 4,677,557 | 6/1987 | Stumpe | 364/426.01 |
| 4,691,792 | 9/1987 | Shintani | 177/1 |
| 4,795,219 | 1/1989 | Brearley et al. | 303/9.69 |
| 4,828,331 | 5/1989 | Klein | 303/31 |
| 4,858,137 | 8/1989 | Bradley | 364/463 |
| 4,888,696 | 12/1984 | Akatsu et al. | 364/424.05 |
| 4,924,392 | 5/1990 | Kurosawa | 364/424.05 |

*Primary Examiner*—Thomas G. Black
*Attorney, Agent, or Firm*—Roger L. May; Allan J. Lippa

[57] ABSTRACT

A vehicle inertia and center of gravity estimator uses averaged displacement measurements to estimate changes in vehicle body mass, vehicle center of gravity location, and vehicle pitch moment of inertia, due to variations in fuel load, passenger load, and cargo load. The system is responsive to the acceleration of the vehicle for providing displacement readings, the mass of the vehicle, and the rotation of the vehicle to optimally adjust vehicle parameters. Variables used in estimating vehicle conditions include vehicle vertical displacement, vehicle ride height, vehicle mass, vehicle pitch moment of inertia, vehicle center of gravity location, and vehicle wheel base.

9 Claims, 3 Drawing Sheets

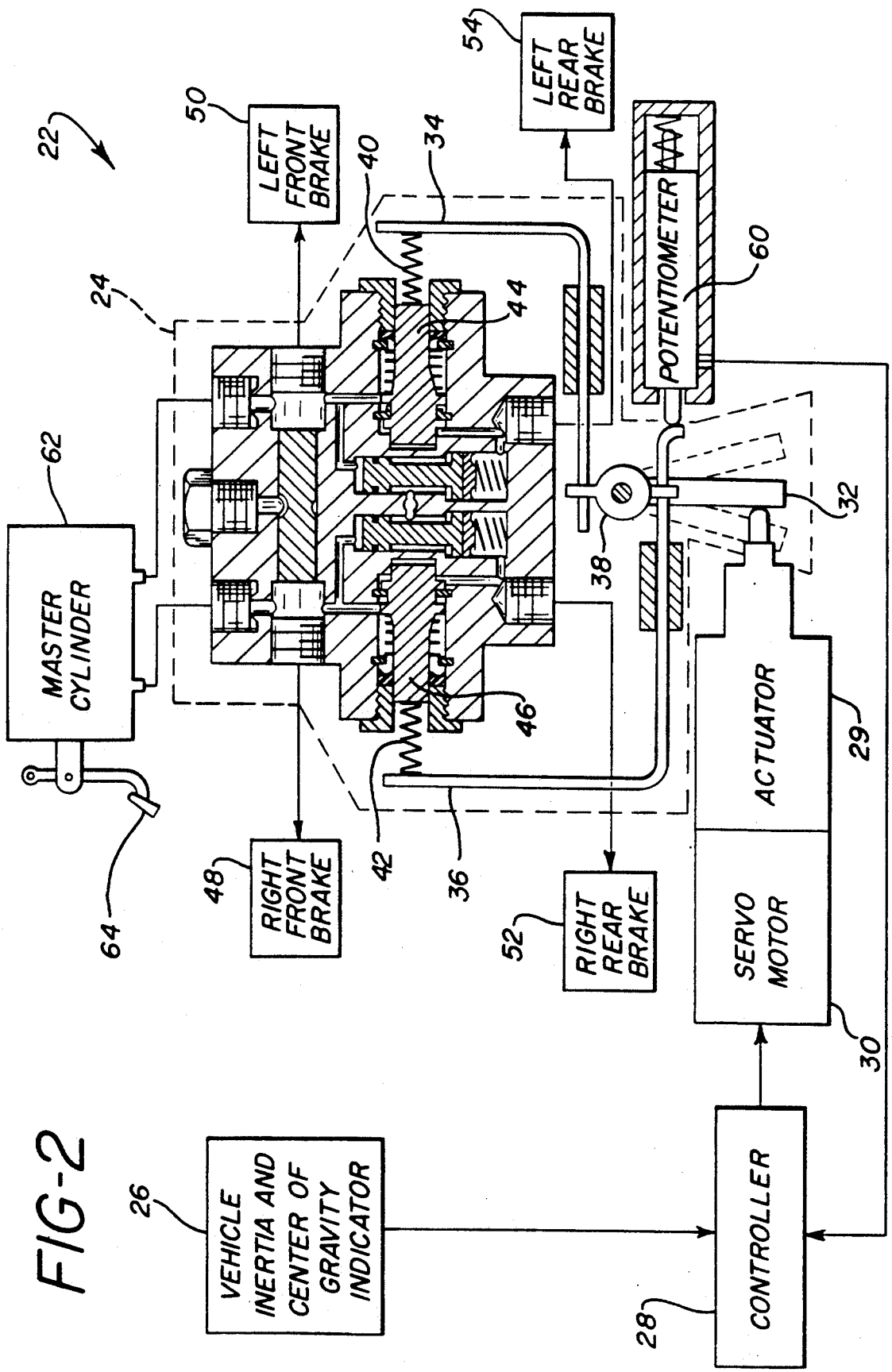

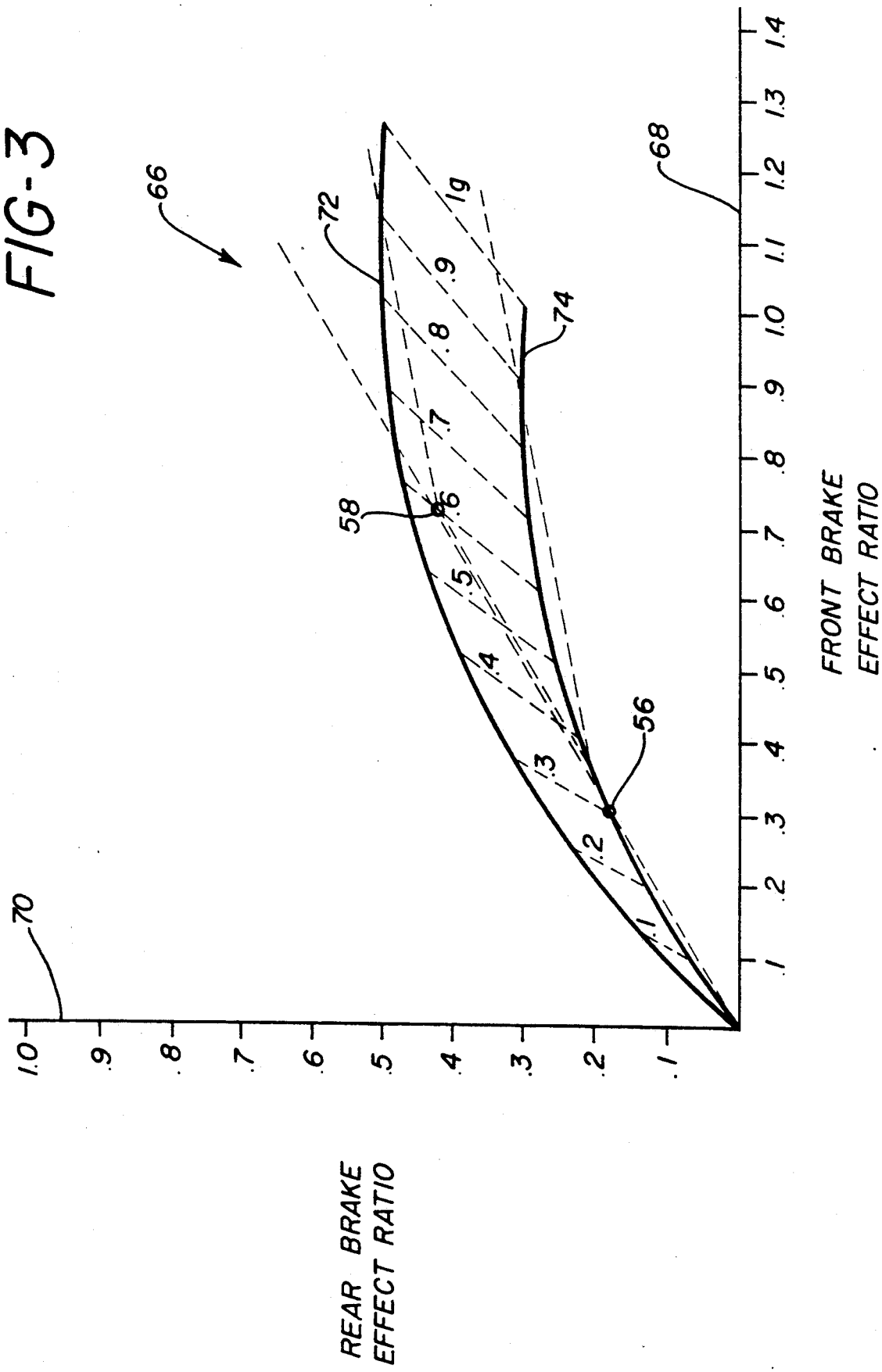

VEHICLE INERTIA AND CENTER OF GRAVITY ESTIMATOR

BACKGROUND OF THE INVENTION

The present invention relates generally to center of gravity location and, more particularly, to a system for estimating, in real time, vehicle conditions relating to loading/unloading for determination of vehicle mass, pitch moment of inertia, and center of gravity location.

Current systems estimate the vehicle center of gravity and merely assume the best weight of the vehicle distributed over the four wheels. On line knowledge of changes in vehicle mass, inertia, and change in center of gravity location can be used to apportion braking effort from front to rear, optimize active suspension heights and stiffnesses, adjust steering angles in a four wheel steered vehicle, and optimize traction control action.

For example, U.S. Pat. No. 4,603,921, issued to Liggett, discloses a brake proportioning system for a vehicle which is responsive to the presence or absence of loads exceeding a threshold at various locations in the vehicle, such as passenger or cargo-carrying locations. Load presence sensor switches, a signal processing system such as an onboard computer, and an electrically controllable brake proportioning valve respond to the presence of weight in a vehicle. The ratio of rear-to-front braking effort is controlled by the proportioning valve so that the ratio increases as the number of passengers and cargo-load presences increases. Both the weight and the location of the loads influences the brake proportioning ratio.

One method of determining the load on a vehicle is disclosed in U.S. Pat. No. 4,691,792, issued to Shintani. The Shintani reference discloses a method and apparatus for measuring the net weight of a load on a vehicle. The method for measuring the weight of a load includes the steps of detecting axial force applied to each suspension cylinder mounted between the vehicle body frame and the axles, and then compensating for or correcting the detected axial force in accord with respective mounting angles of links mounted in the axle and the inclination angle of the vehicle body.

In U.S. Pat. No. 4,110,605, issued to Miller, a method for computing the gross weight and center of gravity for an aircraft instrumentation and control system is disclosed. The computations are made by measuring longitudinal axis and normal axis acceleration components in conjunction with air data parameters, pressure ratios or fan speeds of the engines and the positions of the flap-slat and horizontal stabilizer aerodynamic control surfaces. However, for an aircraft, the center of gravity and weight are determined based on dynamic equilibrium; whereas, for a car, measurements are based on static equilibrium.

It is seen then that there is a need for a vehicle center of gravity estimator which adjusts to changes in vehicle parameters due to loading and unloading of fuel, passengers, and/or cargo, based on static equilibrium.

SUMMARY OF THE INVENTION

The present invention meets this need by providing a vehicle loaded mass, center of gravity location and inertia estimator which uses time averaged displacement measurements to estimate, in real time, vehicle parameters and changes due to loading and unloading of fuel, passengers, and cargo. In the present invention, the vehicle Parameters preferably computed are vehicle mass, pitch moment of inertia, and center of gravity location. The measurements used to compute these parameters may be from any suitable means including displacement transducers, calibrated strain gages on the suspension, or numerical integration of accelerometer outputs. Baseline values used for calibration are stored in memory, and the on line estimates are computed.

In one embodiment of the present invention, a system for estimating vehicle conditions for a vehicle comprises: means responsive to the acceleration of the vehicle for providing a displacement reading; means responsive to the mass of the vehicle for providing a measure of gross weight of the vehicle; means responsive to rotation of the vehicle for providing a measure of pitch moment of inertia of the vehicle; and means for estimating a center of gravity of the vehicle based on the displacement reading, the gross weight, and the pitch moment of inertia.

In a further embodiment of the present invention, the system for estimating vehicle conditions for a vehicle having a proportioning valve, comprises: means responsive to the acceleration of the vehicle for providing a displacement reading; means responsive to the mass of the vehicle for providing a measure of the mass of the vehicle; means responsive to rotation of the vehicle for providing a measure of pitch moment of inertia of the vehicle; means for estimating a center of gravity of the vehicle based on the displacement reading, the mass, and the pitch moment of inertia; and means responsive to the center of gravity estimate for adjusting vehicle parameters. In a preferred embodiment of the present invention, the means responsive to the center of gravity estimate comprises means for adjusting the proportioning valve of the vehicle.

According to the present invention, the system mass, a pitch moment of inertia, and a center of gravity, comprises: means for providing vehicle displacement displacement measurements for providing an estimate of, changes in vehicle mass; a second output responsive to the vehicle displacement measurements for providing an estimate of vehicle center of gravity location; a third output responsive to the vehicle displacement measurements for providing an estimate of vehicle pitch moment of inertia; and means responsive to the first output, the second output, and the third output for adjusting vehicle parameters. A preferred means for providing vehicle displacement measurements may comprise displacement transducers or means for integrating accelerometer outputs to provide an averaged reading of suspension deflection due to vehicle loading and unloading.

In a preferred embodiment of the invention, the first output comprises: means for determining vehicle vertical displacement due to loading of the vehicle; means for determining vehicle ride height after loading; and means for estimating vehicle mass for the vehicle after loading based on the vehicle vertical displacement and the vehicle ride height. The second output preferably comprises: means for determining vehicle vertical displacement due to loading of the vehicle; means for determining vehicle ride height after loading; means for applying a fixed wheel base measurement; and means for estimating vehicle center of gravity location for the vehicle after loading based on the vehicle vertical displacement, vehicle ride height, and wheel base. Finally, the third output preferably comprises: means for determining vehicle mass for vehicle in unloaded condition;

means for determining vehicle center of gravity for vehicle in an unloaded condition; means for determining vehicle pitch moment of inertia for vehicle in unloaded condition; means for applying the first output; means for applying the second output; and means for estimating vehicle pitch moment of inertia for the vehicle after loading based on the vehicle mass, the vehicle center of gravity for vehicle, and the vehicle pitch moment of inertia for vehicle in unloaded condition.

The present invention provides a system for estimating vehicle pitch moment of inertia for a vehicle having mass and a center of gravity location, and further being in a loaded condition, the system comprising: a first variable related to mass of the vehicle when the vehicle is in an unloaded condition; a second variable related to mass of the vehicle when the vehicle is in a loaded condition; a third variable related to center of gravity of a vehicle when the vehicle is in an unloaded condition; a fourth variable related to center of gravity of a vehicle when the vehicle is in a loaded condition; a fifth variable related to pitch moment of inertia for the vehicle when the vehicle is in an unloaded condition; and estimating means for estimating a pitch moment of inertia for a vehicle when the vehicle is in a loaded condition, the estimating means responsive to the first variable, the second variable, the third variable, the fourth variable, and the fifth variable.

Finally, the present invention provides a system for estimating center of gravity for a vehicle comprising: a first variable related to vehicle vertical displacement for the front portion of the vehicle due to loading of the vehicle; a second variable related to vehicle vertical displacement for the rear portion of the vehicle due to loading of the vehicle; a third variable related to wheel base; a fourth variable related to ride height of the front portion of the vehicle; a fifth variable related to ride height of the rear portion of the vehicle; and estimating means for estimating a center of gravity location for the vehicle when the vehicle is in a loaded condition, the estimating means responsive to the first variable, the second variable, the third variable, the fourth variable, and the fifth variable.

An advantage of the present invention is that center of gravity estimates are useful in a variety of vehicle applications including brake pressure control, four-wheel drive steering compensation, four wheel drive optimization, traction control, active suspension optimization, and braking system adjustments. Instead of merely estimating center of gravity and presuming the weight of the car as distributed over the four wheels, the present system provides for displacement reading inputs to output the mass of the vehicle and the down shift of the car due to the added weight of a load, the vehicle pitch moment of inertia, and the center of gravity location. The invention provides for the center of gravity location to change as the load changes.

Other objects and advantages of the invention will be apparent from the following description, the accompanying drawings, and the appended claims.

BRIEF DESCRIPTION OF THE DRAWINGS

FIG. 2 is a block diagram illustrating control of the proportioning valve; and

FIG. 3 is a graphical representation of the brake proportioning valve pressure for the vehicle in both, an unloaded and a loaded condition.

DESCRIPTION OF THE PREFERRED EMBODIMENT

Figure 1A:
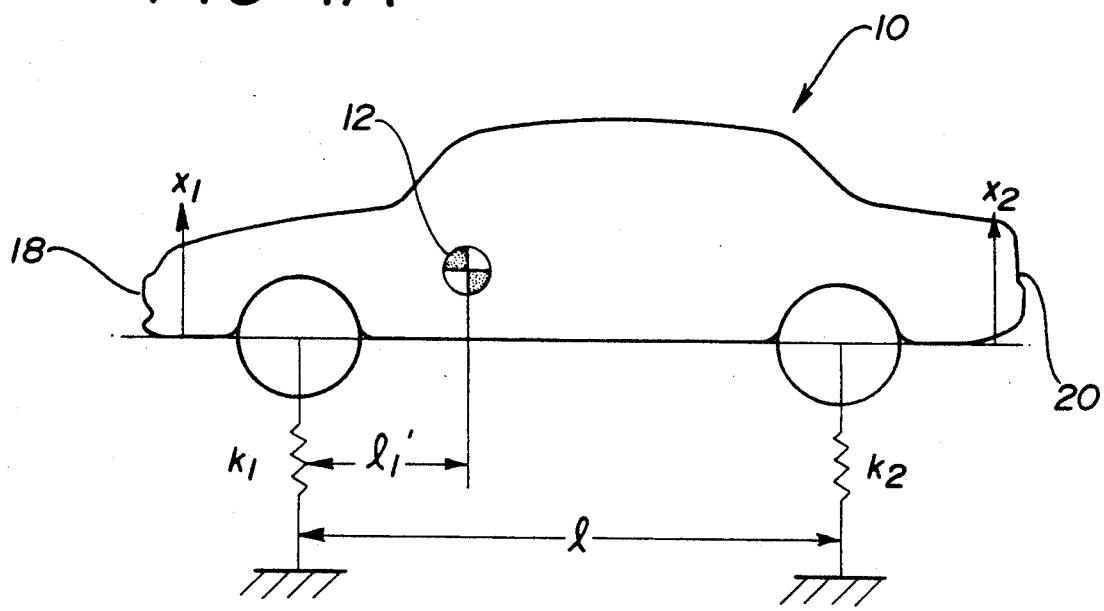
FIG. 1A illustrates a vehicle showing the variables used in determining the vehicle center of gravity location when the vehicle is in an unloaded condition.
Figure 1B:
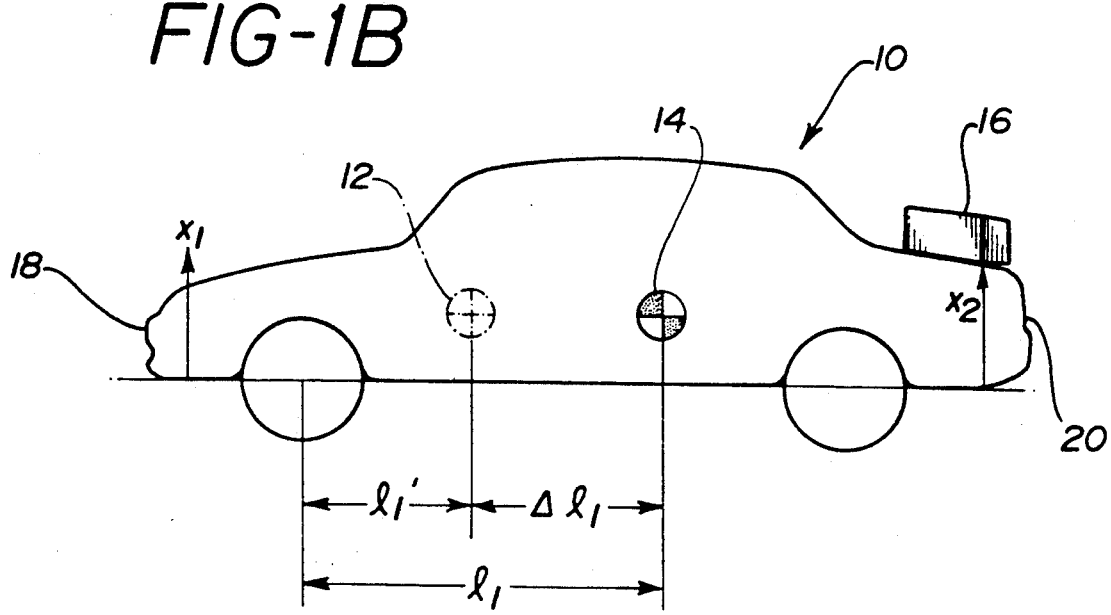
FIG. 1B illustrates a vehicle showing the variables used in determining the vehicle center of gravity location when the vehicle is in a loaded condition.

Referring now to FIGS. 1A and 1B, a vehicle 10 is illustrated to show the variables used in determining the vehicle center of gravity location. Specifically, vehicle 10 in FIG. 1A illustrates a center of gravity location 12 for a vehicle in an unloaded condition; gravity location 12 has now shifted to a center of gravity location 14 as a result of the load 16 which has been added to the vehicle 10. The load 16 may be any typical load including one or more passengers, fuel, or cargo.

In FIGS. 1A and 1B, the vehicle 10 has a front portion 18 and a rear portion 20. The center of gravity location 12 in FIG. 1A is determined by means for estimating a center of gravity or other estimating means, such as by calculating the distance $l_1'$, which is the distance from the front axle to the center of gravity location 12, according to the equation $$l_1' = (k_2 l x_2')/(k_1 x_1' + k_2 x_2').$$

In the above equation, $k_1$ is the ride height of the front portion 18 of the vehicle 10 and $k_2$ is the ride height of the rear portion 20 of the vehicle 10. The ride height of the vehicle changes as the load 16 is added or removed from the vehicle. Also, in the above equation, $x_1$ and $x_2$ represent the vehicle vertical displacement for the front portion 18 and the rear portion 20, respectively. Finally, $l$ is a fixed wheel base measurement. A means for applying the fixed wheel base measurement, measured from the front axle to the rear axle of the vehicle 10, is a center of gravity location equation.

The prime symbol (') represents a variable which is a baseline variable, for a vehicle in an unloaded condition. The system requires means responsive to the acceleration of the vehicle 10 for providing the displacement readings $x_1$ and $x_2$, or other means for providing vehicle displacement measurements. Such means or measurements may be from displacement transducers, calibrated strain gages on the suspension, or from numerical integrations of accelerometer outputs, to give an averaged reading of suspension deflection due to vehicle loading. Also, means for determining vehicle ride height may be any suitable means including a ride height meter.

The center of gravity location 14 in FIG. 1B, after loading of the vehicle 10, is estimated according to the equation $$l_1 = (k_2 l x_2)/(k_1 x_1 + k_2 x_2),$$

In the center of gravity location equations, $x_1$ is a first variable related to vehicle vertical displacement for the front portion of the vehicle due to loading of the vehicle; $x_2$ is a second variable related to vehicle vertical displacement for the rear portion of the vehicle due to loading of the vehicle; $l$ is a third variable related to wheel base; $k_1$ is a fourth variable related to ride height of the front portion of the vehicle; and $k_2$ is a fifth variable related to ride height of the rear portion of the vehicle.

In addition, a means responsive to the gross weight or mass M' for the unloaded vehicle 10 of FIG. 1A is provided. A preferred means responsive to the weight is the equation $$M' = 1/g(k_1 x_1' + k_2 x_2'),$$

Similarly, a preferred means for determining vehicle mass M after loading of the vehicle 10 of FIG. 1B, or estimating means, is according to the equation $$M = 1/g(k_1 x_1 + k_2 x_2),$$

where the variable g is gravity. In the mass equations, $x_1$ is a first variable related to vehicle vertical displacement for the front portion of the vehicle due to loading of the vehicle; $x_2$ is a second variable related to vehicle vertical displacement for the rear portion of the vehicle due to loading of the vehicle; $k_1$ is a third variable related to ride height of the front portion of the vehicle; and $k_2$ is a fourth variable related to ride height of the rear portion of the vehicle.

Finally, means responsive to the rotation of the vehicle 10, or estimating means, are provided according to a pitch moment of inertia about the loaded center of gravity location equation $$J = J' - \Delta M \Delta l^2_1 - 2M'l_1' \Delta l_1 + [Ml_1 - M'(l_1 - \Delta l_1)]^2/M.$$

In this equation, J' represents the vehicle inertia for a vehicle in the unloaded condition, reflecting the distribution of mass M' about the center of gravity location 12, and J reflects the distribution of mass M about the center of gravity location 14. Also, $\Delta l_1$ represents the difference between $l_1$ of FIG. 1B and $l_1'$ of FIG. 1A. In the pitch moment of inertia equation, M' is a first variable related to mass of the vehicle when the vehicle is in an unloaded condition; M is a second variable related to mass of the vehicle when the vehicle is in a loaded condition; $l_1'$ is a third variable related to center of gravity of a vehicle when the vehicle is in an unloaded condition; $l_1$ is a fourth variable related to center of gravity of a vehicle when the vehicle is in a loaded condition; and J' is a fifth variable related to pitch moment of inertia for the vehicle when the vehicle is in an unloaded condition.

The estimate of changes in vehicle mass may be generally referred to as a first output responsive to the vehicle displacement measurements; the estimate of vehicle center of gravity location may generally be referred to as a second output responsive to the vehicle displacement measurements; and the estimate of vehicle pitch moment of inertia may generally be referred to as a third output responsive to the vehicle displacement measurements. In one embodiment of the present invention, the third output is responsive to the first output and the second output.

Referring now to FIG. 2 and continuing with FIGS. 1A and 1B, a block diagram 22 is shown to illustrate control of a proportioning valve 24. The proportioning valve 24 can be controlled in accordance with the changing center of gravity and vehicle inertia values, which are supplied by a vehicle inertia and center of gravity indicator 26. The vehicle inertia and center of gravity indicator 26 produces signals indicating the center of gravity location and loaded mass of the vehicle 10 of FIGS. 1A and 1B. A means responsive to the center of gravity estimate for adjusting vehicle parameters is illustrated as controller 28 which operates on the signals produced by the vehicle inertia and center of gravity indicator 26. The controller 28, which also represents means responsive to the first, second, and third outputs responsive to the vehicle displacement measurements, generates a control signal which actuates, via an actuator mechanism 29, a servo motor or d.c. electric motor 30 to drive a lever 32 to the left when the vehicle 10 is unloaded, or to the right when the vehicle is loaded, as shown by dashed lines. Consequently, block diagram 22 is #a preferred means for applying the first, second and third outputs to estimate vehicle conditions and adjust vehicle parameters, such as brake pressure.

In FIG. 2, sliders 34 and 36, which are latched to a shaft 38 of the lever 32, compress or release springs 40 and 42, which add to or release the force on the proportioning valve 24 metering pistons 44 and 46. The movement of the lever 32 to the left or right affects the pressure of the brake fluid supplied to the right front brake 48, the left front brake 50, the right rear brake 52, and the left rear brake 54. When the springs 40 and 42 are compressed, the "knee" of a pressure curve in described in more detail below.

A potentiometer 60 in FIG. 2, which is in continual contact with the slider 36, indicates the position and, therefore, the amount of force on the metering pistons 44 and 46 to remove the control signal to the servo motor 30 when the proper piston force is obtained. The double proportioning valve 24, the servo motor 30, and the potentiometer 60, are located in the engine compartment of the vehicle 10 and are associated with a brake master cylinder 62 and a brake pedal 64. Means responsive to the center of gravity estimate preferably comprises means for adjusting the proportioning valve 24 of the vehicle 10 to optimally control brake pressure. Knowing the center of gravity location and the weight of the vehicle 10, the controller 28 is programmed to add spring forces acting on the proportioning valve metering pistons 44 and 46 to adjust the equilibrium of the pressure ratio between the master cylinder 62 and the brakes 48, 50, 52, and 54.

Referring now to FIG. 3, a graphical representation 66 of the brake proportioning valve 24 pressure is illustrated. An x-axis 68 represents a front brake effect ratio, which is proportional to the brake pressure. Typically, rear brake cylinders of a vehicle are smaller than front brake cylinders, so that the brake , effort of the rear cylinders is less than that of the front cylinders. The actual brake effect required is a curved line, wherein the upper curved line 72 represents the brake effect for a loaded vehicle 10, as in FIG. 1B, and the lower curved line 74 represents the brake effect for an unloaded vehicle 10, as in FIG. 1A.

The invention provides estimates of vehicle mass, vehicle center of gravity location, and vehicle pitch moment of inertia. The invention also provides for the center of gravity location to shift accordingly as the vehicle load changes. Center of gravity estimates are useful in a variety of vehicle applications including brake pressure control, four-wheel steering compensation, four wheel drive optimization, traction control, active suspension optimization, and braking system adjustments. Instead of merely estimating center of gravity and presuming the weight of the car as distributed over the four wheels, the present system provides for displacement reading inputs to output the mass of the vehicle and lower ride height of the vehicle due to the added weight of a load, the vehicle pitch moment of inertia, and the center of gravity location.

Having described the invention in detail and by way of reference to preferred embodiments thereof, it will be apparent that modifications and variations are possible without departing from the scope of the invention which is defined in the appended claims.

What is claimed is:

1. A system for estimating vehicle conditions for a vehicle having mass and being capable of acceleration, the vehicle including a proportioning valve and brakes, the system comprising:
   means responsive to the acceleration of the vehicle for providing a displacement reading;
   means responsive to the mass of the vehicle for providing a measure of the mass of the vehicle;
   means responsive to rotation of the vehicle for providing a measure of pitch moment of inertia of the vehicle;
   means for estimating a center of gravity of the vehicle based on said displacement reading, said mass, and said pitch moment of inertia; and means, responsive to said center of gravity estimate, for adjusting said proportioning valve of the vehicle to optimally control brake pressure of said brakes.

2. A system for estimating vehicle conditions for a vehicle having mass, a center of gravity location, and a pitch moment of inertia, and further having a suspension and one or more of a brake pressure control, four-wheel steering, four-wheel drive, a traction control, active suspension optimization means and a braking system, the system comprising:
   means for providing vehicle displacement measurements;
   a first output responsive to said vehicle displacement measurements for providing an estimate of changes in vehicle mass;
   a second output responsive to said vehicle displacement measurements for providing an estimate of vehicle center of gravity location;
   a third output responsive to said vehicle displacement measurements for providing an estimate of vehicle pitch moment of inertia; and
   means responsive to said first output, said second output, and said third output for adjusting vehicle parameters selected form the group consisting of brake pressure, four-wheel steering, four-wheel drive, traction, active suspension, braking system, and combinations thereof.

3. A system for estimating vehicle conditions as claimed in claim 2 wherein said means for providing vehicle displacement measurements comprises displacement transducers.

4. A system for estimating vehicle conditions as claimed in claim 2 wherein said means for providing vehicle displacement measurements comprises calibrated strain gages on the suspension.

5. A system for estimating vehicle conditions as claimed in claim 2 wherein said means for providing vehicle displacement measurements comprises means for integrating accelerometer outputs to provide an averaged reading of suspension deflection due to vehicle loading and unloading.

6. A system for estimating vehicle conditions as claimed in claim 2 wherein said first output comprises:
   means for determining vehicle vertical displacement due to loading of the vehicle;
   means for determining vehicle ride height after loading; and
   means for estimating vehicle mass for vehicle after loading based on said vehicle vertical displacement and said vehicle ride height.

7. A system for estimating vehicle conditions as claimed in claim 2 wherein said second output comprises:
   means for determining vehicle vertical displacement due to loading of the vehicle;
   means for determining vehicle ride height after loading;
   means for applying a fixed wheel base measurement; and
   means for estimating vehicle center of gravity location for vehicle after loading based on said vehicle vertical displacement, said vehicle ride height, and said wheel base.

8. A system for estimating vehicle conditions as claimed in claim 2 wherein said third output is based on said first output and said second output.

9. A system for estimating vehicle conditions as claimed in claim 2 wherein said third output comprises:
   means for determining vehicle mass for vehicle in unloaded condition;
   means for determining vehicle center of gravity for , vehicle in an unloaded condition;
   means for determining vehicle pitch moment of inertia for vehicle in unloaded condition;
   means for applying said first output;
   means for applying said second output; and
   means for estimating vehicle pitch moment of inertia for vehicle after loading based on said vehicle mass for vehicle in unloaded condition, said vehicle center of gravity for vehicle in an unloaded condition, said vehicle pitch moment of inertia for vehicle in unloaded condition, said first output, and said second output.

* * * * *